US012595011B2

(12) United States Patent
Eckart et al.

(10) Patent No.: US 12,595,011 B2
(45) Date of Patent: Apr. 7, 2026

(54) CARGO CONTAINER WITH UNIVERSAL VEHICLE RACK MOUNT

(71) Applicant: Stowe Trunks LLC, Los Angeles, CA (US)

(72) Inventors: Corinne Eckart, Los Angeles, CA (US); Paige Anderson, Boulder, CO (US); Steven O'toole Dodson, Gresham, OR (US)

(73) Assignee: Stowe Trucks LLC, Los Angeles, CA (US)

( * ) Notice: Subject to any disclaimer, the term of this patent is extended or adjusted under 35 U.S.C. 154(b) by 135 days.

(21) Appl. No.: 18/603,508

(22) Filed: Mar. 13, 2024

(65) Prior Publication Data

US 2025/0289526 A1 Sep. 18, 2025

(51) Int. Cl.
*B62J 9/24* (2020.01)
*B62J 7/02* (2006.01)

(52) U.S. Cl.
CPC .. *B62J 9/24* (2020.02); *B62J 7/02* (2013.01)

(58) Field of Classification Search
CPC .................................... B62J 9/24; B62J 7/02
USPC ........................................................ 224/412
See application file for complete search history.

(56) References Cited

U.S. PATENT DOCUMENTS 1,858,846 A * 5/1932 Woolsey .............. B65D 85/305
217/17
1,919,427 A * 7/1933 Foreman ................. B65D 9/34
217/66

2,783,927 A * 3/1957 Harley ...................... B62J 9/23
224/430
4,217,999 A * 8/1980 Forsman ................... B60R 9/12
211/70.5
4,249,684 A * 2/1981 Miller ...................... B60R 9/00
410/82
4,325,531 A * 4/1982 Omholt ..................... B62J 9/30
248/553
4,565,074 A * 1/1986 Morgan .................... F25D 3/08
62/464
5,285,935 A * 2/1994 Hsueh ....................... B62J 1/16
224/450
5,762,244 A * 6/1998 Wagner ................... B60R 11/00
224/281

(Continued)

FOREIGN PATENT DOCUMENTS

CH 437013 A * 5/1967 ................ B62J 9/00

*Primary Examiner* — Nathan J Newhouse
*Assistant Examiner* — Lester L Vanterpool

(57) ABSTRACT

A cargo container with universal rack mount system enables rigidly and releasably mounting to a large variety of different configurations and dimensions of vehicle racks. The container has a base panel, at least a portion of which has an array of openings extending therethrough. The system may also include at least one optional retention member with at least one opening extending therethrough, and at last one fastening assembly. The fastening assembly comprises an elongated member having a first portion for engaging an element of a vehicle rack, and a second portion having at least one element that is adapted to extend through one of the base panel array openings and one retention member openings. If present. The second portion further includes an engagable securing feature and a retaining element configured to releasably engage the securing feature for releasably securing the base panel to the rack.

25 Claims, 3 Drawing Sheets

(56) References Cited

U.S. PATENT DOCUMENTS

| | | | | |
|---|---|---|---|---|
| 6,126,124 | A * | 10/2000 | Wagner | A45C 11/20 |
| | | | | 248/163.1 |
| 6,145,719 | A * | 11/2000 | Robert | B60R 7/14 |
| | | | | 224/435 |
| 6,666,362 | B1 * | 12/2003 | LeTrudet | B60P 7/13 |
| | | | | 410/82 |
| D496,321 | S * | 9/2004 | McMurtrey | D12/115 |
| 6,786,374 | B2 * | 9/2004 | Schlecht | B60R 5/04 |
| | | | | 296/37.16 |
| 8,065,889 | B1 * | 11/2011 | Silberman | F25D 3/08 |
| | | | | 62/457.7 |
| 8,360,288 | B2 * | 1/2013 | Shih | B62J 7/00 |
| | | | | 224/450 |
| 8,407,933 | B2 * | 4/2013 | Cink | A01M 1/026 |
| | | | | 43/132.1 |
| 9,296,442 | B2 * | 3/2016 | van Balveren | B62J 7/04 |
| 11,890,996 | B2 * | 2/2024 | Jackson | B60R 11/06 |
| 12,169,036 | B2 * | 12/2024 | King | F01N 13/1822 |
| 2003/0047576 | A1 * | 3/2003 | Babbitt | B62J 9/27 |
| | | | | 224/560 |
| 2004/0226944 | A1 * | 11/2004 | Lee | B65D 11/1826 |
| | | | | 220/4.28 |

* cited by examiner

CARGO CONTAINER WITH UNIVERSAL VEHICLE RACK MOUNT

FIELD OF THE INVENTION

The invention relates to the field of cargo containers for vehicles, and more specifically relates to cargo containers releasably mountable to a rack affixed to a vehicle, such as a bicycle.

All documents cited to or relied upon below are hereby expressly incorporated by reference herein.

BACKGROUND

In recent years, there has been a significant increase in people that have turned to bicycles, and especially battery-powered bicycles, i.e., e-bikes, to act as their second vehicle, in place of a car. However, despite this significant increase in people using bicycles in such manner, the way in which people carry cargo on their bicycles has not evolved. Bike baskets and panniers still dominate the bicycle market. Neither option allows a bike commuter the security, the carrying capacity, or the freedom that an automobile provides.

Typical enclosures available to carry cargo on bicycles include storage boxes specifically designed to secure to specific receiving mounts, such as the "hardshell locking box" manufactured by Rad Power Bikes disclosed at, for example, www.radpowerbikes.com/products/hardshell-locking-box, that is designed to be secured to certain ones of its e-bikes, and not intended for use with others of its e-bikes, or with bicycles including e-bikes produced by other manufacturers. Also, conventional enclosures that attach to a variety of bicycle rack configurations available from, for example, West Biking™ Shop, including its Bicycle 3-in-1 Rear Luggage, disclosed at www.west-biking.us/collections/bicycle-bags/products/west-biking % E2%84% A2-bicycle-3-in-1-rear-luggage?variant=37817346392256, rely on hook-and-loop fastener strips, to secure the enclosure to the rack. However, such enclosure systems often do not remain rigidly attach to the racks while riding, and offer little security from theft.

Therefore, a need exists, especially by many bicycle commuters and other cyclists, for a vehicle cargo container having an attachment system that enables such container to releasably attach to a variety of vehicle rack configurations in such manner as to provide a high level of security from theft.

BRIEF SUMMARY OF THE INVENTION

The present invention is directed to a cargo container having a configuration with an advantageous universal mounting systems for rigidly and releasably affixing it to a large variety of different configurations and dimensions of vehicle racks, such as racks affixed to, for example, a bicycle, moped, motorcycle, automobile, all-terrain vehicle ("ATV") and/or utility task vehicle ("UTV").

In an exemplary embodiment consistent with the principles of the invention, the container has an open end and a base panel. The base panel having a first surface located within the container and a second surface located external to the container, wherein at least a portion of the base panel has an array of openings extending therethrough from the first surface to the second surface. This embodiment may also include at least one optional retention member having at least one opening extending therethrough, and at last one fastening assembly for releasably attaching the container to at least one corresponding element of a vehicle rack.

The fastening assembly comprises: (i) an elongated member having a first portion for engaging the rack element, and a second portion having at least one element that is adapted to extend through one of the base panel array openings and one of the at least one opening of the optional retention member, if present, wherein the second portion further includes an engagable securing feature; and (ii) a retaining element configured to releasably engage the second portion securing feature of the elongated member.

By advantageously employing a sufficient number of openings in one or more arrays in regions of the base panel in accordance with the disclosed embodiments of the invention, a large variety of options are provided for one or more elongated members to engage elements of a vehicle rack, such as frame elements of the rack, which may be located in different regions and orientations of a large variety of commercially-available and custom rack configurations.

In one embodiment, the optional retention member is a washer having a surface area in at least one dimension that is larger than a corresponding at least one dimension of the base panel opening through which the elongated member extends. In another embodiment, the retention member is a rail with at least one opening extending therethrough is at least one of a slot or hole, wherein the rail has at least one surface area dimension larger than the base panel opening through which the elongated member extends. It is possible in accordance with this disclosure for such rail to be in the form of an L-bracket.

In yet another embodiment, the securing feature of the elongated member second portion comprises a threaded element for engaging the securing feature in the form of a nut. It is possible for such nut to have an exterior shape and size to enable tightening of such nut onto the threaded elongated member's second portion by at least one of a tool and hand tightening. It should be readily understood that any element or device that is configured to releasably engage the second portion's securing feature and inhibit movement of the container when the elongated member first portion has engaged the rack element may be used as the securing feature. Exemplary other securing feature useable with the disclosed container include at least one of a clamp, cotter pin or detent assembly, such as a spring-operated pin or ball.

In a further embodiment, the first portion of the elongated member possesses a J-shape for engaging the rack element. Similarly, it is possible for the first portion of the elongated member to possess a U-shape for engaging the rack element. Correspondingly, the second portion's securing feature may have two threaded elements that are adapted to extend through two corresponding base panel array openings, wherein the retaining element for engaging the second-end securing feature may be two corresponding nuts. It is possible for the U-shaped elongated member to be rigid or a semi-rigid, e.g., in the form of a cable manipulatable into a U-shape when engaging the rack element.

In yet a further embodiment, the base panel array of openings are arranged in a grid pattern with, for example, at least one of the grid pattern openings having a shape of at least one of square, rectangular, diamond-shaped, round and oval.

In another embodiment, the base panel is constructed from a same material as used for forming at least a portion of the container.

In yet another embodiment, a removable floor panel may be disposed in the interior of the container proximate the base panel, which may be adapted so that it may be secured to the interior of the container by at least one of screws, clips, snap fitting and pressure fitting. In another embodiment, interior surfaces of at least one wall of the container adjacent have a plurality of protrusions to support the removable floor panel at a predetermined distance from the base panel. Likewise, in another embodiment the rail of the retention member rail is an L-bracket, wherein a vertical member of the L-bracket is adapted to extend perpendicular to the interior surface of the base panel and has a sufficient length to enable supporting the removable floor panel at a predetermined distance from the base panel.

In a further embodiment, the open end of the container is adapted for receiving a lid, and such lid may be attached by at least one hinge. In a still further embodiment, a locking mechanism is attached to at least one of the lid and container for engaging a lock receiving element on the corresponding at least one of container and lid.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION

Figure 1:
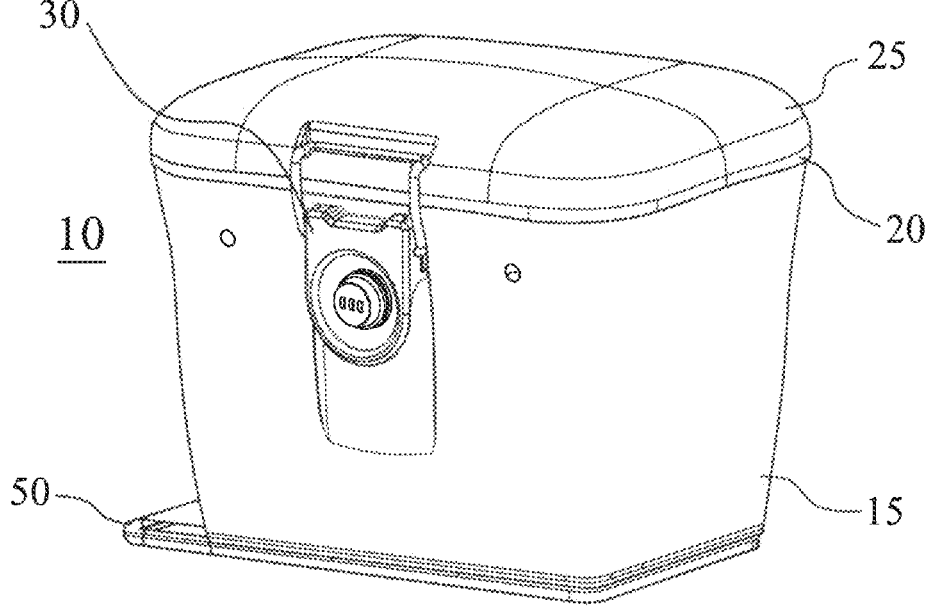
FIG. 1 depicts an illustrative example of some of a container according to various embodiments described herein.

The terminology used herein is for the purpose of describing particular embodiments only and is not intended to be limiting of the claimed invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

As used herein, the term "container" refers to an object, such as, but not limited to, a trunk, basket or enclosure with an opening to receive cargo for transporting, and may be optionally fully enclosed with a lid.

As used herein, the term "vehicle rack" means a device attached or attachable to a vehicle to facilitate carrying loads.

As used herein, the term "vehicle" means any vehicle capable of having a rack affixed thereto including, for example, a bicycle (whether human-powered or battery-powered, such as an e-bike), moped, motorcycle, automobile, ATV and/or UTV.

In describing the invention, it will be understood that a number of embodiments are disclosed. Each of these embodiments has its own advantageous features, and each of such features can also be used in conjunction with one or more, or in some cases all, of the other disclosed techniques. Accordingly, for the sake of clarity, this description will refrain from repeating every possible combination of the individual container configurations in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention, and is not intended to limit the invention to the specific embodiments illustrated by the figures or description below.

FIG. 1 depicts an illustrative example of a container 10 in the form of a bicycle trunk secured to a vehicle rack, such as bicycle rack 50. The container 10 includes a body 15 having an open end 20 depicted as covered by a hinged-lid 25 shown in a closed position and secured to the body 15 by a lock assembly 30.

Figure 2:
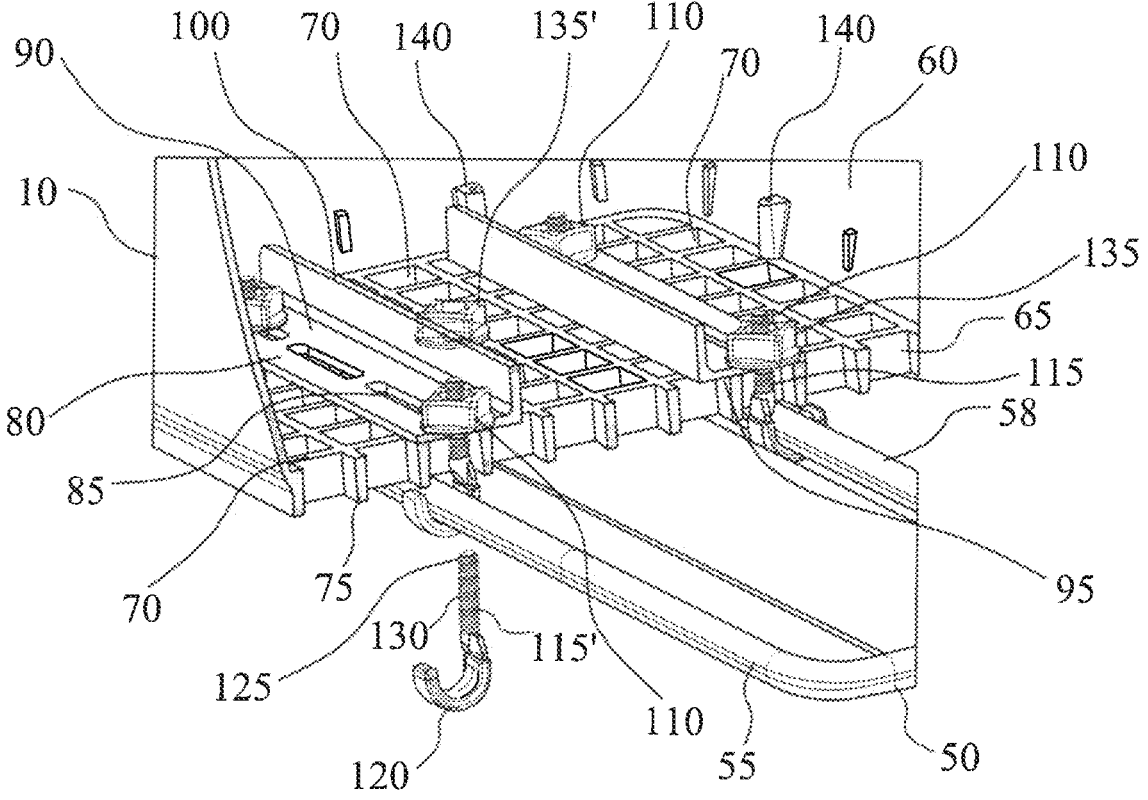
FIG. 2 depicts a cutaway view of the exemplary container in FIG. 1, in the process of being releasably secured to a representative vehicle rack.

FIG. 2 depicts a cutaway view of a portion of the container 10 as secured to a vehicle rack, such as bicycle rack 50. In FIG. 2, the container 10 includes an interior wall surface 60 and a base panel 65 having an interior surface 78 and an exterior surface 75. The illustrated exemplary configuration of base panel 65 is a grid with a plurality of openings 70 extending threrethrough from the interior surface 78 and an exterior surface 75. Optional retention members in the form of L-shaped rails 80 with slots 85 (or in the alternative other-shaped openings) extending from a first rail horizontal surface 90 to a second rail horizontal surface 95. The depicted L-shaped rails 80 further includes an optional vertical member 100, which may be useable to support a removable floor panel 150 as described herein with regard to FIG. 3.

Four exemplary fastening assemblies 110 are shown for releasably securing the container 10 to an elements or members 55 and 58 of the bicycle rack 50. Each fastening assembly 110 includes an elongated member 115 having a first portion 120, illustrated as a J-hook, for engaging a corresponding position of the respect rack elements 55 and 58, and a second portion 125 adapted to extend through a respective one of the base panel array openings 70 and one of the slots retention member opening 85.

The second portion 125 of each elongated member 115 includes an engagable securing feature such as, for example, threads 130. Respective retaining element 135, depicted in the form of nuts, releasably engage the threads 130 of the elongated member second portions 125 for releasably securing the base panel 65, and retention members 80, if present, to the elements 55 and 58 of the bicycle rack 50. Each nut 135 should have an overall width, e.g., an effective outer diameter, which is larger than the base panel openings 70, or openings 85, if the retention element 80 is present, to prevent the nut 135 from falling through the corresponding opening 70 or 85.

In the alternative, a large washer (not shown) may be used with a nut to achieve the securing of the container 10 to the bicycle rack 50. In such embodiment, the washer should have a sufficiently large diameter to prevent the nut 135 from falling through the corresponding base panel opening 70, or opening 85, if the retention element 80 is present. An exploded view of one of the fastening assemblies 110 shown by reference numbers 115' and 135'. Also, shown in FIG. 2 are protrusions 140 for engaging a removable floor panel 150 as shown and described with regard to FIG. 3.

The base panel 65 may be constructed of a same material as used for at least a portion of the container body 15 (shown in FIG. 1), and may be formed integral with the body 15 or separate from, and affixed to, the body 15. It is further possible for the base panel to be manufactured from a different material than portions of the body 15, without departing from the principles of the disclosed invention.

As shown in FIG. 2, the advantageous use of the container base panel 65 with its plurality of openings 70 enables the container 10 to be releasably secured to bicycle racks having many different configurations and designs, and the container does not have to be configured to be secured to any specific single rack design as is commonplace in the market today. This is accomplished by locating one or more fastening assembly 110 in different ones of the base panel openings to accommodate different bicycle rack configurations for securing the container 10 to respective elements of the bicycle rack typically provided and used as attachment locations for bungee cords.

Although the use of four fastening assemblies 110 are shown, it should be readily understood that a lesser or large number of fastening assemblies 110 may be used to secure the container 10 to different bicycle rack configurations. Further, because the fastening assembly 110, depicted as comprising a threaded J-hook and nut in FIG. 2, is secured from the inside of the container 10, it provides increased security from theft when the lid 25 of the container 10 is locked inhibiting access to loosen or disengage the fastening assembly 110.

The use of fastening assemblies 110 with a J-hook elongated member facilitates case of installation and securing of the container 10 to a vehicle rack, such as the bicycle rack 50. However, alternative fastening assemblies may be used including without limitation, U-shaped elongated members for engaging the rack elements, and having a second portion securing feature of two respective threaded elements that are adapted to extend through two corresponding base panel array openings, wherein the retaining element for engaging such second portion securing feature 125 are two respective nuts. Such U-shaped elongated members may in the form of a completely rigid element or have portions being flexible, or semi-rigid, such as for example, using a single- or multi-strand cable for the portion of the elongated member that forms the "U" that engages an element of the bicycle rack 50.

Although the retaining element 135 is depicted as a nut, it should be readily understood that alternative forms of retaining elements may be used as the retaining element 135 in accordance with this disclosure including conventional configurations such as, for example, clamps, cotter pins, detent assemblies, such as a spring-operated pins or balls, and other conventional retaining element devices and apparatus.

The depicted base panel 65 in FIG. 2 includes a grid providing the plurality of rectangular-shaped openings 70 in a regular pattern covering a majority of the base panel 65 for case of illustration. However, it should be readily understood by a skilled artisan that the advantageous container design of this disclosure may employ different shaped holes in the base panel 65, such as without limitation square, rectangular, diamond-shaped, round and/or oval shapes. Moreover, in an alternative embodiment the openings 70 in the base panel 65 may be disposed in one or more portions of the base panel in regular and/or irregular patterns.

In addition, it is possible in accordance with the present disclosure to employ retention members 80 in the form of, for example, washers (not shown) having respective areas in at least one dimension that is larger than a corresponding at least one dimension of the base panel opening 70 through which the elongated member 115 extends. The washer further having a hole sufficiently large for receiving the elongated member 115.

In a similar manner, flat rails with slots or holes, or washers may be used for the retention member 80, instead of the depicted L-shaped rails 80 in FIG. 2. As noted above with regard to the use of washers as the retention member 80, such flat rails should have at least one opening extending therethrough in the form of, for example, a slot or hole, wherein the rail has at least one dimension larger than the base panel opening through which the elongated member extends.

Although the use of retention members 80 depicted in FIGS. 1 and 2 advantageously provide reinforcement of the base panel 65 for affixing the container 10 to the rack 50, it is possible to practice the invention without the use of such retention elements, i.e., with just the fastening assemblies 110 directly mounting the container base panel 65 to elements of the rack 50.

Figure 3:
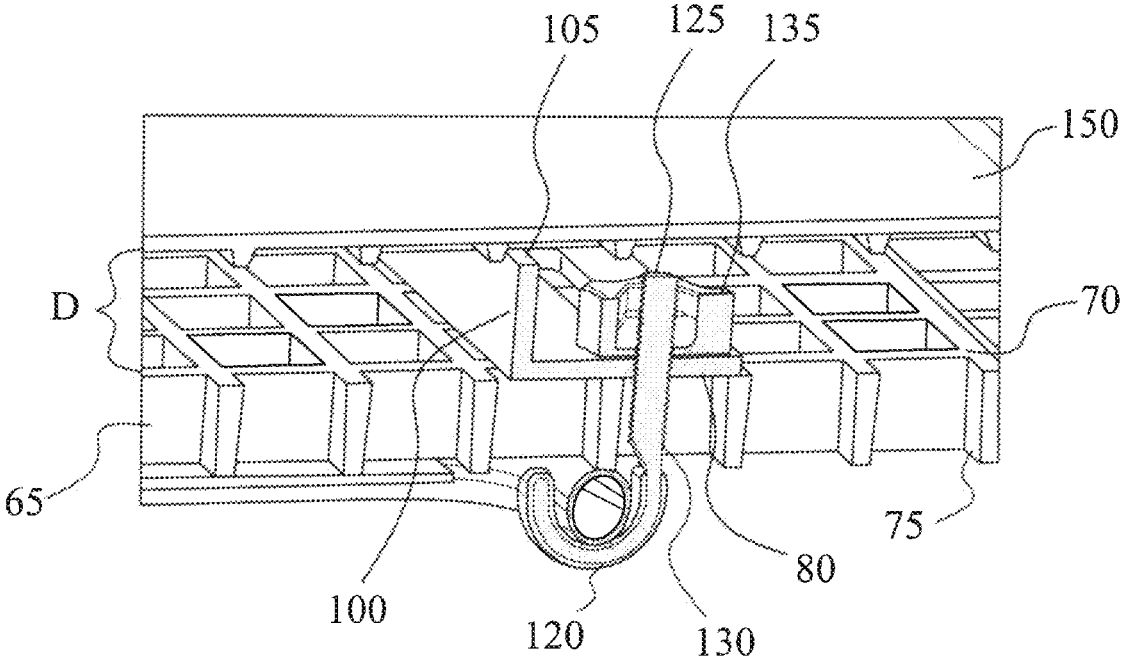
FIG. 3 depicts a portion of the cutaway view of the exemplary container in FIG. 2, with a representative removable floor panel installed.

FIG. 3 depicts a similar exemplary cutaway view to that shown in FIG. 2, with like-reference numbered components, such as the base panel 65, retention member 80 and fastening assembly elongated member first end120. A removable floor panel 150 is also illustrated in FIG. 3. Such floor panel 150 may be supported by the protrusions 140 shown in FIG. 2, and/or a top edge 105 of the optional vertical member 100 of the L-shaped rail 80. The member 100 may have a sufficient length to enable supporting the removable floor panel 150 at a predetermined distance D from the base panel 65.

The removable floor panel 150 enables the container 10 to have a flat floor upon which to place cargo, and not have such cargo contact the fastening assemblies 110 or retention member 80. Such floor panel 150 may also act to resist infiltration of debris and water into the interior of the container 10 that may pass through the openings 70 of the base panel 65. The panel 150 may optionally be secured to the interior of the container by screws, clips, snap fitting and/or pressure fitting (not shown).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims. For example, although the container is depicted with its open end disposed opposite the base panel, such open end may be alternatively disposed adjacent the base panel in accordance with the present invention.

REFERENCE SIGNS 10 container
15 container body

7

20 container open end
25 hinged lid
30 lock assembly
50 bicycle rack
55/58 bicycle rack elements
60 container interior wall surface
65 base panel
70 base panel openings
75 base panel exterior surface
78 base panel interior surface
80 retention member/L-shaped rails
85 L-shaped rail slots
90 L-shaped rail first horizontal surface
95 L-shaped rail second horizontal surface
100 L-shaped rail vertical member
105 L-shaped rail vertical member top edge
110 fastening assembly/ies
115 fastening assembly elongated member
120 fastening assembly elongated member first portion
125 fastening assembly elongated member second portion
130 fastening assembly elongated member engagable securing feature
135 retaining element
140 container interior surface protrusions
150 removable floor panel
The invention claimed is:

1. A container with a universal rack mount system comprising:

the container having an open end, and a base panel with a first surface located within the container and a second surface located external to the container, wherein a portion of the base panel defining an area has an array of openings extending therethrough from the first surface to the second surface, and the array of openings in the portion of the base panel is arranged in a grid pattern with a plurality of rows and columns of said openings and wherein outer boundaries of said area of the portion of the base panel correspond to the outer boundaries of said array of openings;

at least one fastening assembly for releasably attaching the container to at least one corresponding element of a rack, said at least one fastening assembly comprising:

i. an elongated member having a first portion for engaging the at least one corresponding element of the rack element, and a second portion having at least one element that is adapted to extend through one of the base panel array openings, wherein the second portion further includes an engagable securing feature, and ii. a retaining element configured to releasably engage the securing feature of the fastening assembly for releasably securing the base panel to the rack, wherein an aggregate square area of the openings comprises a majority of the area of the portion of the base panel to enable multiple mounting options for the elongated member of the at least one fastening assembly to extend through at least one of the base panel array openings at a corresponding location for engaging the at least one corresponding element of the rack element.

2. The system of claim 1 further comprising at least one retention member having a first surface and a second surface, and at least one opening extending therethrough from the first surface to the second surface; wherein the elongated member second surface is adapted to be positioned adjacent the first surface of the base panel, and wherein the elongated member of the at least one fastening assembly is configured to extend through a corresponding retention member opening.

8

3. The system of claim 2, wherein the retention member is a washer having an area in at least one dimension that is larger than a corresponding at least one dimension of the base panel opening through which the elongated member extends.

4. The system of claim 2, wherein the retention member is a rail and the at least one opening extending therethrough is at least one of a slot or hole, wherein the rail has at least one dimension larger than the base panel opening through which the elongated member extends.

5. The system of claim 4, wherein the rail of the retention member rail is a L-bracket.

6. The system of claim 1, wherein the securing feature of the elongated member second portion comprises a threaded element, and the retaining element for engaging the second portion securing feature is a nut.

7. The system of claim 6, wherein the nut has an exterior shape and size to enable tightening of such nut onto the threaded elongated member second portion by at least one of a tool and hand tightening.

8. The system of claim 1, wherein the first portion of the elongated member possesses a J-shape for engaging the rack element.

9. The system of claim 1, wherein the first portion of the elongated member possessing the U-shape for engaging the rack element, and the second portion securing feature has two threaded elements that are adapted to extend through two corresponding base panel array openings, wherein the retaining element for engaging the second portion securing feature are two corresponding nuts.

10. The system of claim 9, wherein the U-shaped elongated member is a cable manipulated into a U-shape when engaging the rack element.

11. The system of claim 1, wherein at least one of the grid pattern openings of the base panel array have a shape of at least one of square, rectangular, diamond-shaped, round and oval.

12. The system of claim 1, further comprising a removable floor panel disposed in the interior of the container proximate the base panel.

13. The system of claim 12, wherein the removable floor panel is adapted to be secured to the interior of the container by at least one of screws, clips, snap fitting and pressure fitting.

14. The system of claim 12, wherein interior surfaces of at least one wall of the container have a plurality of protrusions to support the removable floor panel at a predetermined distance from the base panel.

15. The system of claim 4, wherein the retention member rail is a L-bracket wherein one side of the L-bracket is adapted to extend perpendicular to an interior surface of the base panel and has a sufficient length to enable supporting the removable floor panel at a predetermined distance from the base panel.

16. The system of claim 1, wherein the open end of the container is adapted for receiving a lid.

17. The system of claim 1, further comprising a lid attached proximate said open end of the container by at least one hinge.

18. The system of claim 17, further comprising a locking mechanism attached to at least one of the lid and container for engaging a lock receiving element on the corresponding at least one of container and lid.

19. The system of claim 1, wherein the open end of the container is disposed opposite the base panel.

20. The system of claim 1, wherein the open end of the container is disposed adjacent the base panel.

21. The system of claim 1, wherein the retaining element is at least one of a clamp, cotter pin or detent assembly.

22. The system of claim 1, wherein the base panel is constructed from a same material as used for forming at least a portion of the container.

23. A container with a universal rack mount system comprising:

A container having an open end, and a base panel with a first surface located within the container and a second surface located external to the container, wherein at least a portion of the base panel having an array of openings extending therethrough from the first surface to the second surface;

at least one fastening assembly for releasably attaching the container to at least one corresponding element of a rack, said at least one fastening assembly comprising:

i. an elongated member having a first portion for engaging the rack element, and a second portion having at least one element that is adapted to extend through one of the base panel array openings, wherein the second portion further includes an engagable securing feature; and ii. a retaining element configured to releasably engage the securing feature of the fastening assembly for releasably securing the base panel to the rack; and at least one retention member having a first surface and a second surface and at least one opening extending therethrough from the first surface to the flat second surface: wherein the elongated member second surface is adapted to be positioned adjacent the first surface of the base panel, and wherein the elongated member of the at least last one fastening assembly is configured to extend through a corresponding retention member opening, wherein the retention member is a rail and the at least one opening extending therethrough is at least one of a slot or hole, wherein the rail has at least one dimension larger than the base panel opening through which the elongated member extends, and wherein said rail is an L-bracket.

24. The system of claim 23, wherein one side of the L-bracket is adapted to extend perpendicular to an interior surface of the base panel and has a sufficient length to enable supporting the removable floor panel at a predetermined distance from the base panel.

25. A container with a universal rack mount system comprising:

A container having an open end, and a base panel with a first surface located within the container and a second surface located external to the container, wherein at least a portion of the base panel having an array of openings extending therethrough from the first surface to the second surface;

at least one fastening assembly for releasably attaching the container to at least one corresponding element of a rack, said at least one fastening assembly comprising:

i. an elongated member having a first portion for engaging the rack element, and a second portion having at least one element that is adapted to extend through one of the base panel array openings, wherein the second portion further includes an engagable securing feature; and ii. a retaining element configured to releasably engage the securing feature of the fastening assembly for releasably securing the base panel to the rack; and at least one retention member having a first surface and a second surface, and at least one opening extending therethrough from the first surface to the flat second surface; wherein the elongated member second surface is adapted to be positioned adjacent the first surface of the base panel, and wherein the elongated member of the at least last one fastening assembly is configured to extend through a corresponding retention member opening, wherein the retention member is a rail and the at least one opening extending therethrough is at least one of a slot or hole, wherein the rail has at least one dimension larger than the base panel opening through which the elongated member extends, wherein said rail is an L-bracket; and wherein one side of the L-bracket is adapted to extend perpendicular to an interior surface of the base panel and has a sufficient length to enable supporting the removable floor panel at a predetermined distance from the base panel.

* * * * *